Feb. 16, 1937.  B. F. GRAVELY  2,070,830
ROTARY PLOW
Original Filed June 29, 1933  3 Sheets-Sheet 1
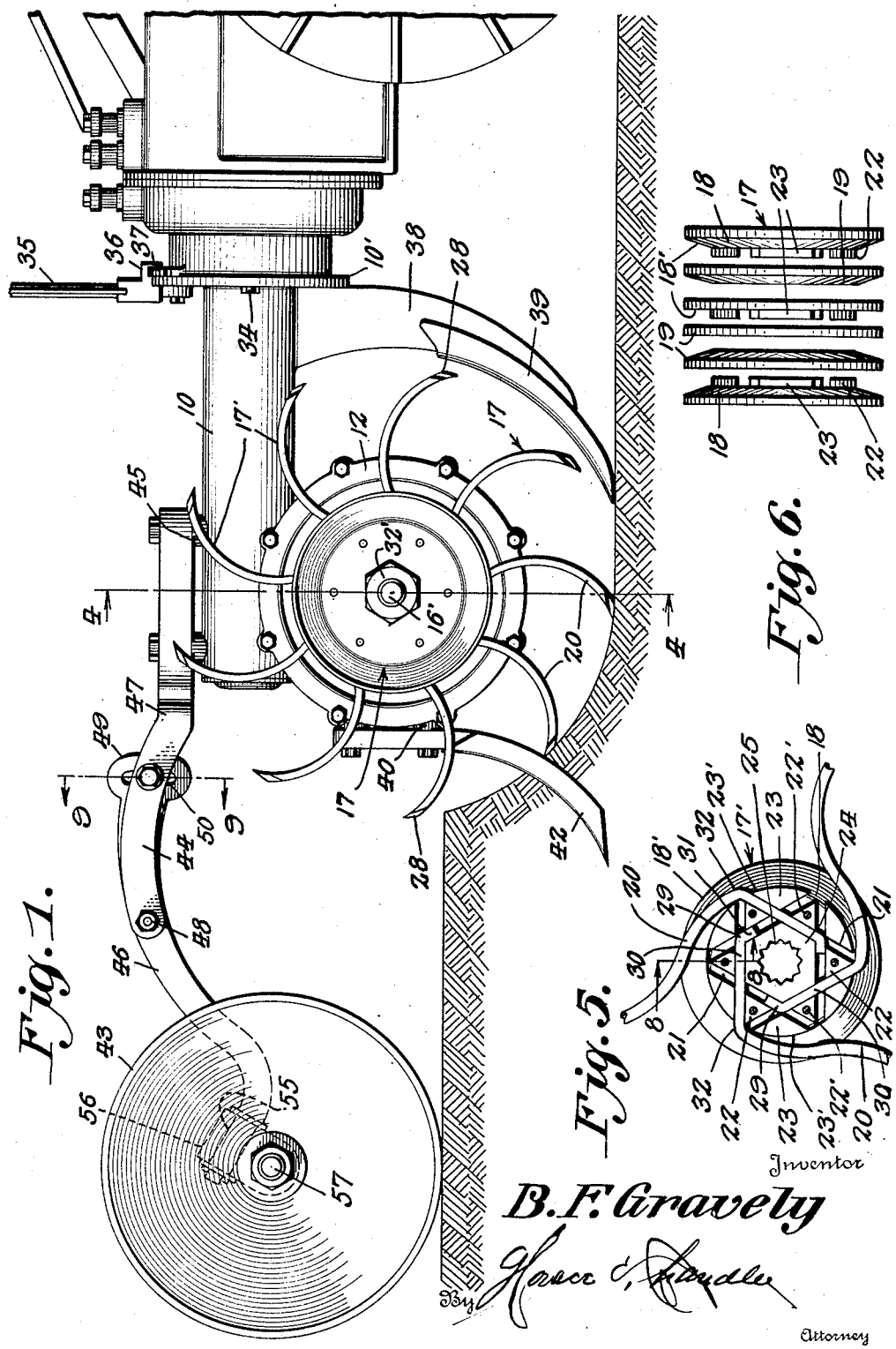
Inventor
B. F. Gravely
By
Attorney

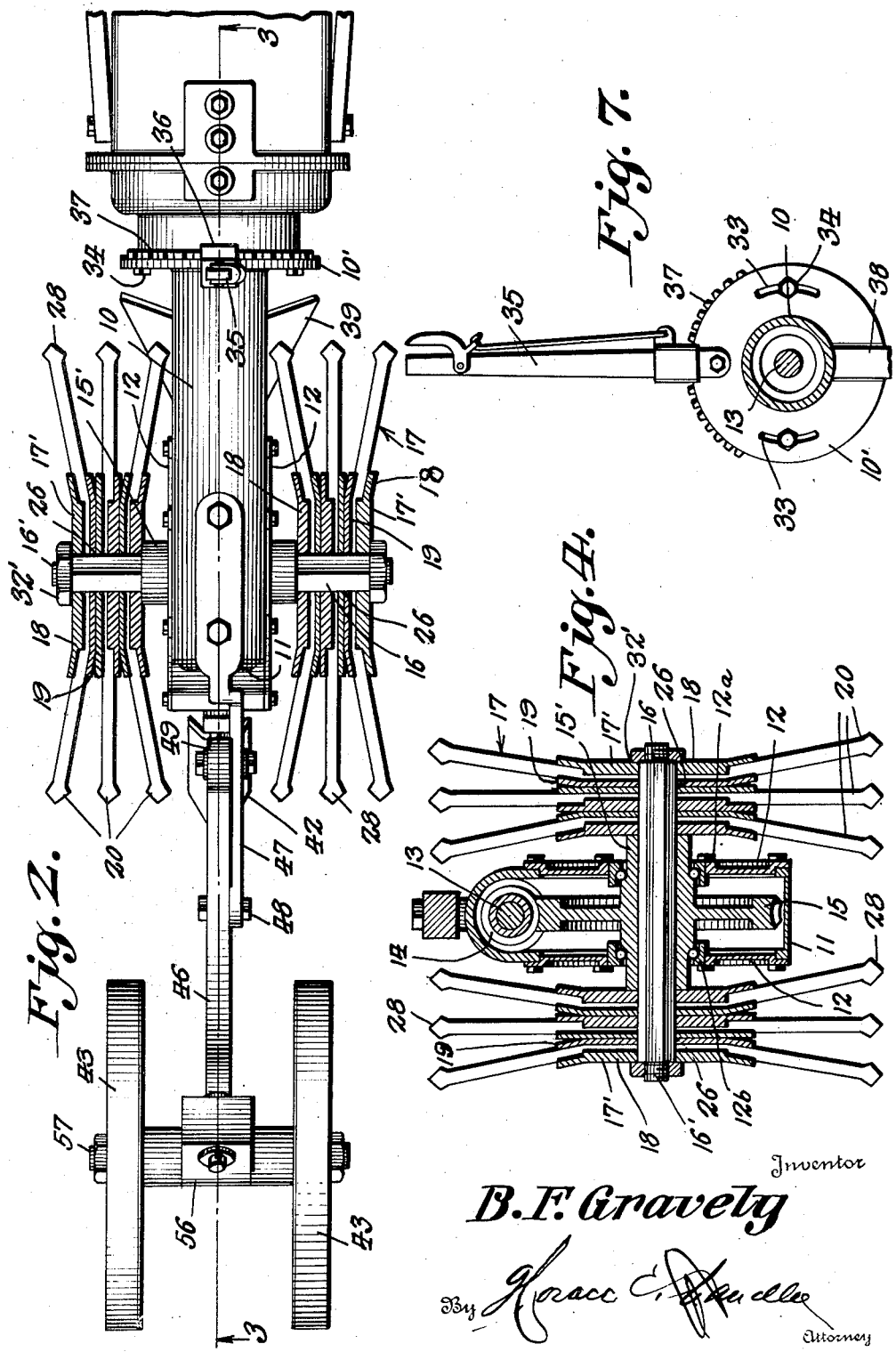

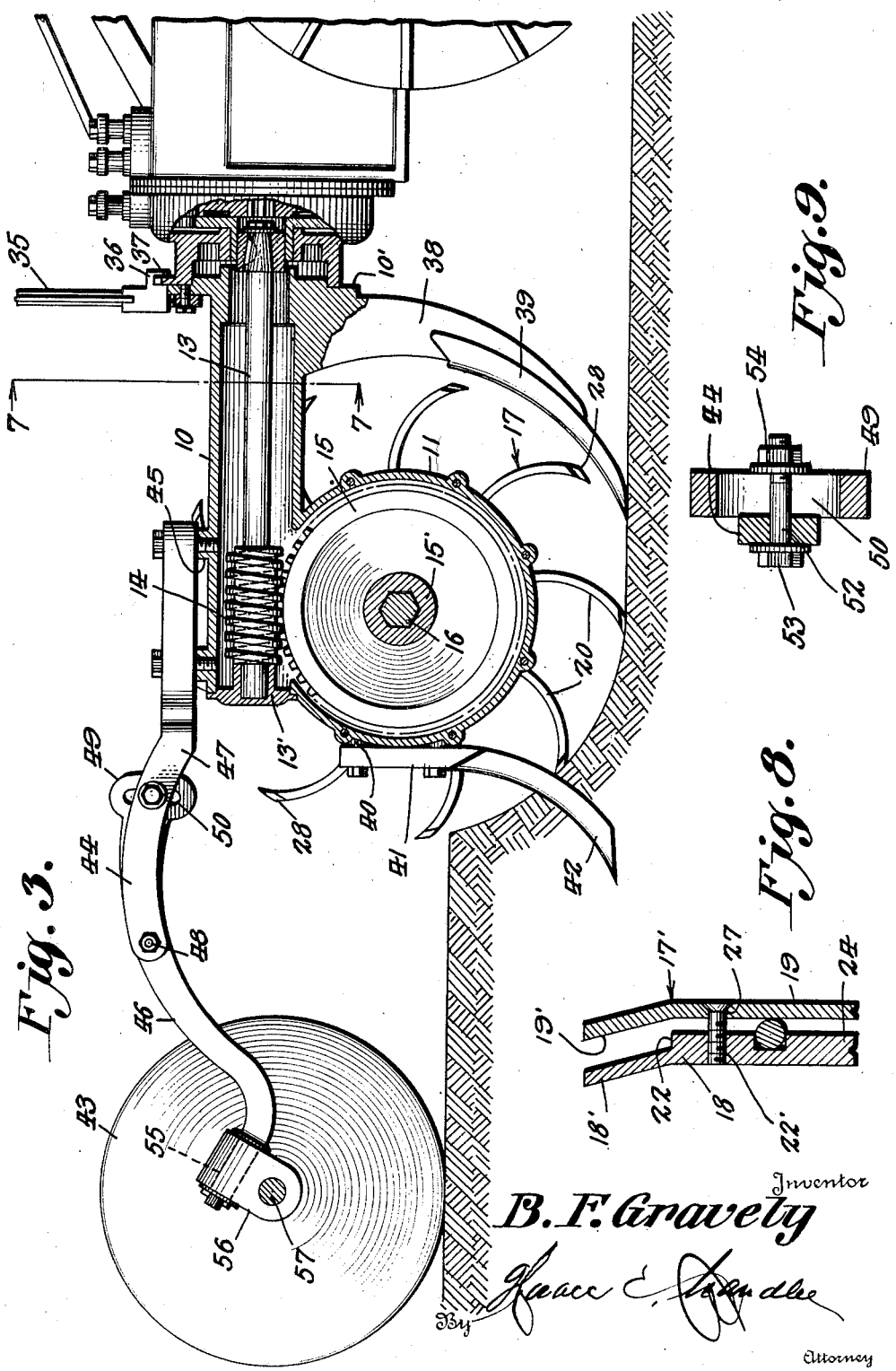

Patented Feb. 16, 1937

2,070,830

UNITED STATES PATENT OFFICE 2,070,830

ROTARY PLOW

Benjamin F. Gravely, Dunbar, W. Va.

Application June 29, 1933, Serial No. 678,283
Renewed July 13, 1936

7 Claims. (Cl. 97—216)

This invention relates to new and useful improvements in rotary plows, and particularly to that type of rotary plow which includes a number of digging tools, or tines, assembled into a unitary structure.

One object of the invention is to provide an implement of the type mentioned which may be mounted at the front of a suitable tractor and in such a way as to permit of its being adjusted to throw the soil to one side or the other.

Another object is to provide means for assembling and mounting the tines whereby they may be securely held in position and yet possess a certain degree of flexibility.

Other objects and advantages will be apparent from the following description when considered in connection with the accompanying drawings.

In the drawings:

Figure 1 is a side elevation of the complete invention mounted on the forward part of a tractor, the latter not being illustrated in detail.

Figure 2 is a front elevation of the same.

Figure 3 is a transverse vertical sectional view on the line 3—3 of Figure 1.

Figure 4 is a vertical sectional view on the line 4—4 of Figure 2.

Referring to the accompanying drawings, 10 represents a horizontal tubular casing having a flange 10' adjacent one end by means of which it is secured to the forward end of the tractor, and formed on the lower side of the forward end of the tubular casing, and depending therefrom, is an enlarged circular portion 11. Bolted to each of the open ends of this transverse casing is a closure plate 12 having a central opening 12a provided with an anti-friction bearing 12b.

Within the casing 10 is a longitudinally arranged shaft 13 having one of its ends operatively connected with the tractor mechanism, not shown, and its other end supported in a bearing 13' carried by the casing. Formed upon the shaft is a worm 14 which meshes with a worm-wheel 15 having a hub 15', the ends of which are supported in and project beyond the bearings 12b. This hub is provided with an axial polygonal opening in which is mounted a correspondingly formed shaft 16, so that the worm-wheel and shaft will rotate as a unit. The shaft 16 projects at both sides of the hub 15' and its extremities are reduced, rounded, and screw-threaded as at 16'.

On each of the projecting ends of the shaft 16 there is mounted a pair of tine assemblies, each being represented as a whole by the numeral 17 and, as these are identical in construction and arrangement, the description of one will suffice for both.

The tine assembly 17 is made up of a plurality of tine units 17', preferably three, as illustrated in the present case, each of which units includes a pair of clamping disks 18 and 19, between which is held a group of three tines, 20. The clamping disk 18, has, on one of its side faces, a plurality of intersecting grooves 21 defined by triangular bosses 22 and 23, and a central hexagonal boss 24, each of the bosses 23 having a curved side 23'. Through the center of the hexagonal boss is a polygonal opening 25 which extends entirely through the disk and which corresponds, in size and shape, with the axial opening through the hub 15'. It will be noted that the grooves 21 form a design as of overlying triangles having their points removed. The face of the marginal portion 18' of the clamping disk 18, outwardly of the triangular bosses 22 and 23 is uninterrupted or smooth. In each of the bosses 22 is a threaded opening 22'.

The clamping disk 19 is entirely flat and is provided with a polygonal central opening 26 corresponding with the opening 25 in the disk 18. It is also provided with screw-holes 27 positioned to correspond with the threaded openings 22' in the disk 18.

Each of the tines 20 is of approximately S-shape, one end being provided with a ground penetrating blade 28, while the other end is bent at an obtuse angle at 29, resulting in the straight portions 30 and 31, the former of which terminates at a bend 32 from whence the tine extends, in a compound curve, to the blade 28 already mentioned.

In assembling each of the tine units 17', three of the tines are placed upon a clamping disk 18 with the straight portions 30 and 31, of each, lying in two of the intersecting grooves 21 and in contact with adjoining faces of the hexagonal boss 24, so that the outermost points of certain of the triangular lugs 22 will lie within the bends 32. The innermost parts of the curved portions of the tines will then lie against the smooth marginal portions 18', of the clamping disk, while the outermost portions will project therebeyond. A clamping disk 18 is then placed over the tines thus assembled and tightly secured to the disk 18 by means of screws passed through the holes 27 of the former disk and into the threaded openings 22' of the latter. Three of the tine units thus assembled are then mounted upon each of the projecting ends of the shaft 16, so that the tines of the units of each assembly will be in staggered relation, as shown in Figure 3. The units are then clamped together and against the projecting ends of the hub 15' by means of nuts 32' screwed upon the ends 16' of the shaft 16.

It will be noted, by reference to Figure 4, that the tines 20 of the central unit of each tine assembly 17 extend outward at right angles to the shaft 16, while those of the units on each side of the central unit incline away from the tines of the central unit. By this arrangement the blades 28 are spaced in such a manner as to result in a much wider furrow than were all of the tines parallel. To accomplish this arrangement, the disks 18 and 19 of the outermost and innermost tine units, of each tine assembly, are dished so that their marginal portions 18' and 19' will extend away from the the central unit and the tines of these units are correspondingly offset at their bends 32. This is clearly illustrated in Figure 6.

From the foregoing, it will be seen that, upon the shaft 13 being driven, motion will be communicated to the worm-wheel 15, through the medium of the worm 14, with the result that the shaft 16 will be rotated and the tines 20 driven into the ground, as the tractor progresses, to a depth which may be regulated in a manner to be described later herein.

Because of the fact that the tines are rigidly held at their straight portions only, which are innermost, their curved portions may flex inwardly as they enter the earth and then spring outwardly, as they emerge therefrom, thus throwing the soil from the furrow more effectively than if this function were dependent entirely upon their speed of rotation.

In order that the tine assemblies may be adjusted to throw the soil to one side of the furrow or the other, as may be desired, the tubular member 10, which indirectly supports the tines, is connected to the tractor in a manner to permit of its being oscillated with respect thereto. That is to say, the flange 10' is provided with arcuate slots 33, through which the securing bolts 34 are passed and screwed into threaded openings in the tractor frame. An adjusting lever 35 is connected to the flange 10' and is provided with a pawl 36, slidably mounted thereon, for selective engagement with a notched segment 37, on the tractor, which pawl may be manipulated in any suitable manner such as by means of the hand grip and rod, as illustrated.

Depending from the rear of the casing 10 is a support 38 which carries a blade 39, and mounted upon lugs 40 projecting from the transverse casing 11, intermediate its ends, is a similar support 41, carrying a blade 42, positioned between the two tine assemblies 17. The blades 39 and 42 are in alignment, the latter serving to loosen the strip of soil between the tines, and the former serving to remove any soil that may not have been encountered by the tines and clean the furrow.

In order to gauge the depth of the furrow, a pair of gauge wheels 43 is provided. These wheels travel on the ground in advance of the mechanism already described, and they are carried at the forward end of the divided bar 44 bolted to lugs 45 formed upon the upper side of the casing 10, at its forward end. The bar 44 is formed of two sections 46 and 47, the latter having an end secured to the lugs 45, as shown. These bar sections are pivotally connected by a bolt 48, the end of the section 46 overlying the section 47 and being provided with an enlargement 49 having a slot 50, and through this slot and threaded into an aligning perforation 51 in the bar section 47 is a clamping bolt 52 having a head 53 which overlies the slot 50, and also having a jam nut 54.

The forward end of the bar section 46 is provided with a trunnion 55, pivotally mounted upon which is a member 56 from both sides of which there project the ends of an axle 57, carried by said member and upon which projecting ends the gauge wheels 43 are journaled. It will be seen that, by loosening the jam nut 54 on the clamping bolt 52, the bar members may be swung on their connecting pivot 48 to raise or lower the gauge wheels whereby to alter the depth of the furrow after which the bolt and jam nut are again tightened.

While the casing 10 has been described as being so mounted as to permit of its being rocked to cause the tines to incline towards one side or the other, it will be understood that it may be so adjusted as to cause the tines to assume a vertical position, should occasion require.

What is claimed is:

1. A tine assembly unit for rotary plows including a plurality of disks, said disks having central portions and marginal portions, said marginal portions being turned out of the plane of said central portions, flexible implements having parts rigidly held between said central portions and parts mounted for movement between said marginal portions, and means for clamping said disks together.

2. An implement assembly for rotary plows including a central unit and outer units, each of said units including disks, said disks having central portions and marginal portions, the marginal portions of the disks of the outer units being turned away from the central unit, implements mounted between the disks of the units and having their ends projecting therebeyond, means for clamping the implements between the disks, and means for holding the units in assembled relation.

3. An implement assembly for rotary plows including a central unit and outer units, each of said units including disks, said disks having central portions and marginal portions, the marginal portions of the disks of the outer units being turned away from the central unit, the central portions of certain of the disks having intersecting grooves, implements having ends supported in the grooves and ends projecting outwardly of the disks, means for clamping the implements between the disks, and means for holding the units in assembled relation.

4. An implement assembly for rotary plows including a central unit and outer units, each of said units including disks, said disks having central portions and marginal portions, the marginal portions of the disks of the outer units being turned away from the central unit, flexible implements having parts rigidly held between said central portions and parts mounted for movement between said marginal portions, and means for clamping said disks together.

5. An implement assembly for rotary plows including a central unit and outer units, each of said units including disks, said disks having central portions and marginal portions, the marginal portions of the disks of the outer units being turned away from the central unit, the central portions of certain of the disks having intersecting grooves, flexible implements having ends rigidly held in said grooves and intermediate portions mounted for movement between said marginal portions, means for clamping the disks together, and means for holding the units in assembled relation.

6. A tine assembly unit for rotary plows including disks mounted in face to face relation, each of said disks having a central portion and a marginal portion, the central portion of one of said disks having intersecting grooves, flexible tines having portions fixedly supported in the grooves, portions supported for movement between said marginal portions, and portions extending beyond the peripheries of the disks, and means for securing the disks together.

7. A tine assembly unit for rotary plows including disks mounted in face to face relation, each of said disks having a central portion and a marginal portion, the central portion of one of said disks having intersecting grooves, flexible tines each having an end portion fixedly supported in one of said grooves, an intermediate portion fixedly supported in another of said grooves, a portion supported for movement between said marginal portions, and a portion extending beyond the peripheries of the disks, and means for securing the disks together.

BENJAMIN F. GRAVELY.